United States Patent
Jiang

(10) Patent No.: US 10,772,032 B2
(45) Date of Patent: Sep. 8, 2020

(54) METHODS, APPARATUSES, USER EQUIPMENT AND BASE STATIONS FOR SENDING AND RECEIVING SYSTEM INFORMATION

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/376,150

(22) Filed: Apr. 5, 2019

(65) Prior Publication Data

US 2019/0246338 A1 Aug. 8, 2019

Related U.S. Application Data

(63) Continuation of application No. PCT/CN2016/101665, filed on Oct. 10, 2016.

(51) Int. Cl.
*H04W 48/14* (2009.01)
*H04W 48/10* (2009.01)
(Continued)

(52) U.S. Cl.
CPC .......... *H04W 48/14* (2013.01); *H04W 48/10* (2013.01); *H04W 52/0206* (2013.01);
(Continued)

(58) Field of Classification Search
CPC ... H04W 48/10; H04W 48/14; H04W 72/042; H04W 72/044; H04W 72/1289;
(Continued)

(56) References Cited

U.S. PATENT DOCUMENTS

2003/0179738 A1* 9/2003 Diachina .............. H04W 48/12
370/349
2012/0165058 A1* 6/2012 Hwang .............. H04W 74/006
455/509

(Continued)

FOREIGN PATENT DOCUMENTS

CN      101572594 A  * 11/2009
CN      101572594 A    11/2009
(Continued)

OTHER PUBLICATIONS

International Search Report (PCT/CN2016/101665) dated Jun. 28, 2017 ISA State Intellectual Property Office of the People Republic of China, WIPO (Year: 2017).*

(Continued)

*Primary Examiner* — Afsar M Qureshi
(74) *Attorney, Agent, or Firm* — Finnegan, Henderson, Farabow, Garrett & Dunner, L.L.P.

(57) ABSTRACT

Methods, user equipment and base stations for sending and receiving system information (SI) are provided. The method of receiving SI includes: in response to receiving first class SI broadcasted by a base station, determining a receiving window and a preamble associated with the to-be-requested SI, wherein the to-be-requested SI belongs to second class SI; in response to arrival of the receiving window associated with the to-be-requested SI, sending the preamble in an uplink subframe configured for sending the preamble; and receiving the to-be-requested SI within the receiving window associated with the to-be-requested SI, wherein the to-be-requested SI is sent by the base station according to the receiving window.

20 Claims, 12 Drawing Sheets

(51) Int. Cl.
*H04W 72/04* (2009.01)
*H04W 52/02* (2009.01)
*H04W 72/12* (2009.01)
*H04W 74/00* (2009.01)

(52) U.S. Cl.
CPC ....... *H04W 72/042* (2013.01); *H04W 72/044* (2013.01); *H04W 72/1289* (2013.01); *H04W 74/006* (2013.01); *Y02D 70/00* (2018.01)

(58) Field of Classification Search
CPC ............ H04W 52/0206; H04W 74/006; Y02D 70/00; Y02D 70/10; Y02D 70/12; Y02D 70/1242
See application file for complete search history.

(56) References Cited

U.S. PATENT DOCUMENTS

| | | | | |
|---|---|---|---|---|
| 2014/0153516 | A1* | 6/2014 | Young | H04W 48/12 370/329 |
| 2016/0234735 | A1* | 8/2016 | Kubota | H04W 48/14 |
| 2017/0251500 | A1* | 8/2017 | Agiwal | H04W 74/0833 |
| 2017/0311342 | A1* | 10/2017 | You | H04B 7/088 |
| 2018/0132166 | A1* | 5/2018 | Ishii | H04W 48/12 |

FOREIGN PATENT DOCUMENTS

| | | | |
|---|---|---|---|
| CN | 101784121 A | 7/2010 | |
| CN | 102378129 A | 3/2012 | |
| WO | WO 2015/005724 A1 | 1/2015 | |
| WO | WO-2015005724 A1 * | 1/2015 | ........ H04W 72/0446 |

OTHER PUBLICATIONS

3$^{rd}$ Generation Partnership Project; Technical Specification Group Radio Access Network; Evolved Universal Terrestrial Radio Access (E-UTRA); Medium Access Control (MAC) protocol specification; 3GPP TS 36.321 V15.4.0 (Dec. 2018).

3$^{rd}$ Generation Partnership Project; Technical Specification Group Radio Access Network; Evolved Universal Terrestrial Radio Access (E-UTRA); Radio Resource Control (RRC); Protocol specification; 3GPP TS 36.331 V15.4.0 (Dec. 2018).

ISA State Intellectual Property Office of the People's Republic of China, International Search Report Issued in Application No. PCT/CN2016/101665, dated Jun. 28, 2017, WIPO, 4 pages.

* cited by examiner

METHODS, APPARATUSES, USER EQUIPMENT AND BASE STATIONS FOR SENDING AND RECEIVING SYSTEM INFORMATION

CROSS-REFERENCE TO RELATED APPLICATION

The present application is a continuation application of International Application No. PCT/CN2016/101665 filed on Oct. 10, 2016, which is incorporated herein by reference in its entirety.

TECHNICAL FIELD

The present disclosure relates to the field of communication technology and more particular to methods, apparatuses, user equipment and base stations for sending and receiving system information.

BACKGROUND

With rapid development of wireless communication technology, a number of pieces of System Information (SI) of Long Term Evolution (LTE) is increasing. Sending the SI of LTE by means of periodical broadcasting may cause large power consumption of a base station and a low utilization rate of a spectrum resource. In a case of a small quantity of accessing User Equipment (UE), a resource waste problem may occur when the SI of LTE is periodic broadcasted. To alleviate the problems of the resource waste and large power consumption of the base station caused by broadcasting the SI of LTE, operators begin to consider solving the above problems by means of broadcasting the SI according to classification.

In the related art, during research and discussion of $5^{th}$ Generation (5G) mobile communication technologies. SI may be divided into first class SI and second class SI, where the first class SI may include SI relating to cell selection and cell access, and the second class SI may include SI other than the first class SI. In the related art, the first class SI may still be sent by broadcasting. For the second class SI, UE sends a particular preamble to request the second class SI. When the particular preamble is received, SI or an SI combination requested by the UE may be feedbacked in response information.

SUMMARY

To solve the problems in the related art, embodiments of the present disclosure provides methods, apparatus, user equipment and a base station for sending and receiving SI to improve sending and receiving efficiency of SI between the base station and the UE, reduce the power consumption of the base station caused by broadcasting SI, and increase a utilization rate of a frequency spectrum resource.

According to a first aspect of the present disclosure, a method of receiving SI is provided, including: in response to receiving first class SI broadcast by a base station, determining a receiving window and a preamble associated with to-be-requested SI, wherein the to-be-requested SI belongs to second class SI; in response to arrival of the receiving window associated with the to-be-requested SI, sending the preamble in an uplink subframe configured for sending the preamble; and receiving the to-be-requested SI within the receiving window associated with the to-be-requested SI, wherein the to-be-requested SI is sent by the base station according to the receiving window.

According to a second aspect of the present disclosure, a method of sending SI is provided, including: sending first class SI which carries scheduling information of second class SI so that UE is enabled to determine a receiving window associated with target second class SI to be requested by the UE; in response to receiving a preamble sent by the UE, determining the target second class SI and a receiving window associated with the target second class SI; and after the preamble is received, sending the target second class SI within the receiving window associated with the target second class SI.

According to a third aspect of the present disclosure, UE is provided, including: a processor; and a memory for storing instructions executable by the processor, wherein the processor is configured to: in response to receiving first class SI broadcast by a base station, determine a receiving window and a preamble associated with to-be-requested SI, wherein the to-be-requested SI belongs to second class SI; in response to arrival of the receiving window associated with the to-be-requested SI, send the preamble in an uplink subframe configured for sending the preamble; and receive the to-be-requested SI within the receiving window associated with the to-be-requested SI, where the to-be-requested SI is sent by the base station according to the receiving window.

According to a fourth aspect of the present disclosure, a base station is provided, including: a processor; and a memory for storing instructions executable by the processor, wherein the processor is configured to: send first class SI which carries scheduling information of second class SI so that UE is enabled to determine a receiving window associated with target second class SI to be requested by the UE; in response to receiving a preamble sent by the UE, determine the target second class SI and a receiving window associated with the target second class SI; and after the preamble is received, send the target second class SI within the receiving window associated with the target second class SI.

The technical solutions provided by embodiments of the present disclosure may include the following beneficial effects.

When receiving the first class SI periodically broadcasted by a base station, UE may be controlled to receive to-be-requested SI within a corresponding receiving window based on the above technical solution. In this way, the problem that that too many preambles are required for sending a combination of multiple pieces of SI, resulting in that the base station has difficulty in sending the SI simultaneously when the UE applies for the multiple pieces of SI at a time, is avoided, and the sending and receiving performance of the SI is improved at the same time.

It is to be understood that the above general descriptions and the below detailed descriptions are merely exemplary and explanatory, and are not intended to limit the present disclosure.

BRIEF DESCRIPTION OF DRAWINGS

The accompanying drawings, which are incorporated in and constitute a part of the present specification, illustrate examples coincident with the present disclosure and serve to explain the principles of the present disclosure together with the specification.

DETAILED DESCRIPTION

Figure 1A:
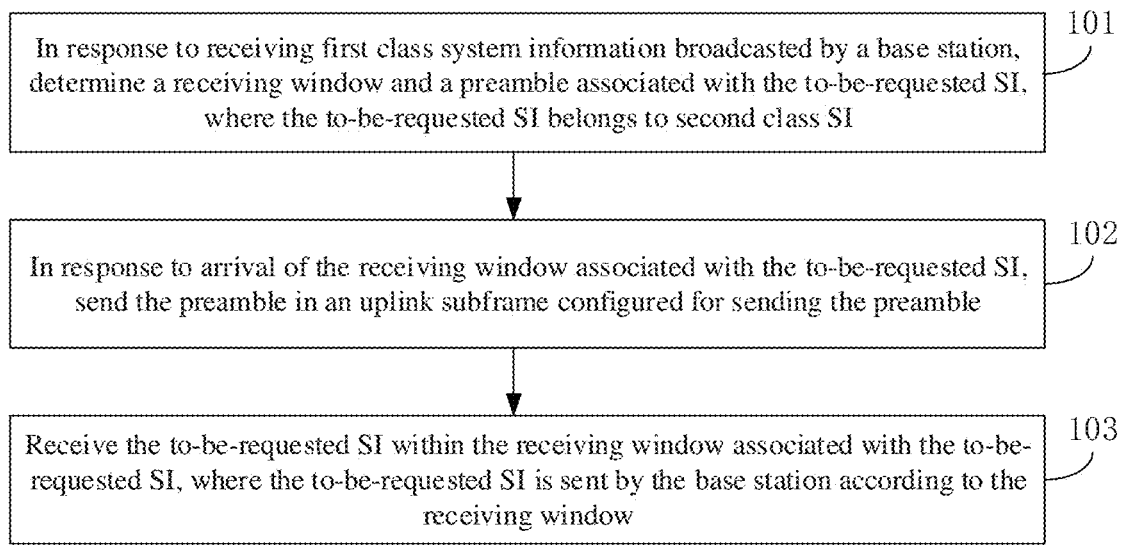
FIG. 1A is a flowchart of a method for receiving SI according to an embodiment of the present disclosure.

Hereinafter, embodiments will be described in detail, examples of which are shown in the drawings. When the following descriptions refer to the drawings, the same numerals in the different drawings denote the same or similar elements unless otherwise indicated. The embodiments described in the following examples are not representative of all embodiments coincident with the present disclosure. Rather, they are merely examples of apparatuses and methods coincident with some aspects of the present disclosure as detailed in the appended claims.

Figure 1B:
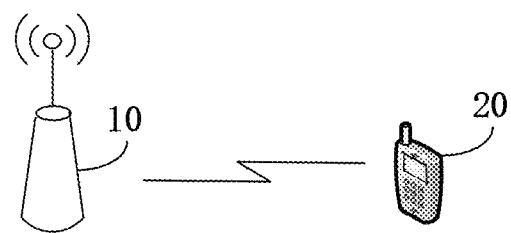
FIG. 1B is a schematic diagram illustrating a scenario of a method for sending and receiving SI according to an embodiment of the present disclosure.

FIG. 1A is a flowchart of a method for receiving system information (SI) according to an embodiment of the present disclosure. FIG. 1B is a schematic diagram illustrating a scenario of a method for sending and receiving SI according to an embodiment of the present disclosure. The method for receiving SI may be applied to User Equipment (UE), and includes the following steps 101-103 as shown in FIG. 1A.

At step 101, in response to receiving first class SI broadcasted by a base station, a receiving window and a preamble associated with to-be-requested SI are determined, where the to-be-requested SI belongs to second class SI.

In an embodiment, the first class SI may include information related to cell selection and cell access, for example, paging information.

In an embodiment, the first class SI may include a scheduling list for recording scheduling information of the second class SI. For example, for each of the second class SI, the scheduling list may record a receiving window length, a scheduling periodicity, and a starting subframe of the receiving window. In an embodiment, the to-be-requested SI belongs to the second class SI, which may be a System Information Block (SIB).

In an embodiment, the first class SI may also include a preamble associated with the second class SI, and the UE may obtain the preamble associated with the second class SI by analyzing the first class SI. In another embodiment, the preamble associated with the second class SI may also be preset by a system, and the UE may determine the preamble associated with the second class SI according to the system preset preamble.

In an embodiment, all of the second class SI may be associated with one preamble. In another embodiment, each of the second class SI may be associated with a different preamble.

In an embodiment, in the scheduling list, each SI is associated with an SI receiving window, and the SI receiving windows of different SI may be arranged next to each other, e.g., neither overlapping nor gap. An appearance order of each SI in the scheduling list is used to indicate an order of the corresponding SI receiving window in the scheduling list.

In an embodiment, determining the receiving window associated with the to-be-requested SI includes a staring frame and a starting subframe of the receiving window. A method for determining the receiving window associated with the to-be-requested SI according to the scheduling information in the scheduling list will be illustrated in FIG. 2 below.

At step 102, in response to arrival of the receiving window associated with the to-be-requested SI, the preamble is sent in an uplink subframe configured for sending the preamble.

In an embodiment, the uplink subframe configured for sending the preamble may be determined by analyzing the first class SI. For example, specific time-frequency domain scheduling information may be obtained by decoding a System Information Radio Network Temporary Identifier (SI-RNTI) on a Physical Downlink Control Channel (PDCCH). In an embodiment, the first uplink subframe after the starting subframe may be determined as the uplink subframe configured for sending the preamble.

In an embodiment, the first uplink subframe configured for sending the preamble may also be determined based on a system preset time-frequency resource. For example, in a case that LTE supports a 5 ms Downlink-to-Uplink switch-point periodicity, the subframe 2 and the subframe 7 may be used as the uplink subframes configured for sending the preamble.

At step 103, the to-be-requested SI is received within the receiving window associated with the to-be-requested SI, where the to-be-requested SI is sent by the base station according to the receiving window.

In an embodiment, since each SI is associated with a receiving window, the base station may determine the SI requested by the UE according to the receiving window.

Figure 3:
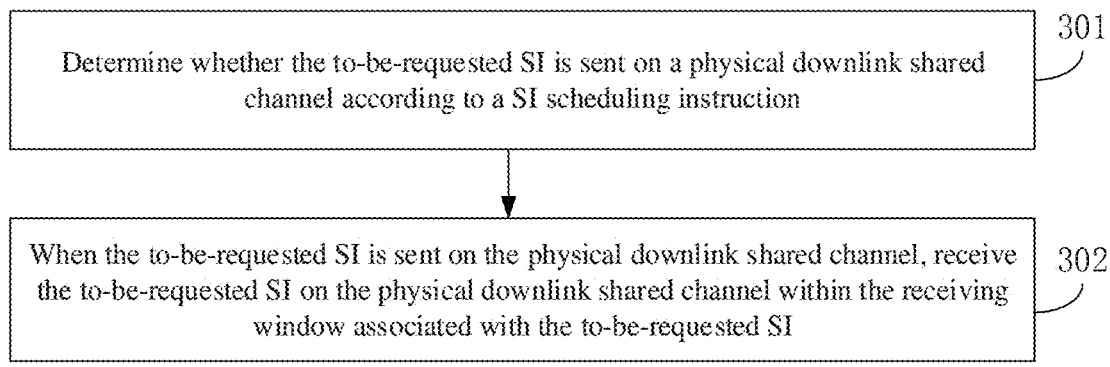
FIG. 3 is a flowchart of a method for receiving SI according to still another embodiment of the present disclosure.

In an embodiment, the corresponding to-be-requested SI may be received a number of times in a downlink subframe within the receiving window. In another embodiment, the UE may also determine whether the base station sends the corresponding to-be-requested SI on a Physical Downlink Shared Channel (PDSCH) according to an SI scheduling instruction SI-RNTI. In a case that the base station sends the to-be-requested SI on the PDSCH, the to-be-requested SI may be received on the PDSCH within the receiving window. FIG. 3 illustrates a method for receiving to-be-requested SI within a receiving window, which will be described in detail below.

In an illustrative scenario, as shown in FIG. 1B, the description is made by taking a mobile network as an LTE network and a base station as an evolved Node B (eNB). In the scenario shown in FIG. 1B, eNB 10 and UE 20 are included, where the eNB 10 periodically broadcasts first class SI, and the UE 20 may determine a receiving window and a preamble associated with to-be-requested SI when receiving the first class SI. When the receiving window associated with the to-be-requested SI arrives, the UE 20 may send the corresponding preamble in a first uplink subframe, and the eNB 10 may send the corresponding to-be-requested SI within a downlink subframe of the receiving window after receiving the preamble. The transmission of each second class SI is limited to the corresponding receiving window, and each of the receiving windows does not overlap. Since the base station may determine which second class SI is requested by the UE according to the receiving window, the preamble associated with each of the second class SI may be same. Therefore, the problems that the preamble consumption is large due to excessive SI combinations and the base station has difficulty in sending the SI combinations simultaneously may be avoided, where the SI combination includes a number of SI sent together.

Based on the above steps 101-103, the UE may be controlled to receive the to-be-requested SI within the corresponding receiving window. In this way, the problem that that too many preambles are required for sending a combination of multiple pieces of SI, resulting in that the base station has difficulty in sending the SI simultaneously when the UE applies for the multiple pieces of SI at a time, is avoided, and the sending and receiving performance of the SI is improved at the same time.

In an embodiment, determining the receiving window of the to-be-requested SI includes: obtaining the scheduling list of the second class SI according to the first class SI, where the scheduling list is configured to record a receiving window length and a scheduling periodicity of the second class SI, and determining the receiving window associated with the to-be-requested SI according to the receiving window length and the scheduling periodicity recorded in the scheduling list.

In an embodiment, determining the receiving window associated with the to-be-requested SI according to the receiving window length and the scheduling periodicity recorded in the scheduling list includes: obtaining a starting frame of the receiving window associated with the to-be-requested SI according to an appearance order of the to-be-requested SI in the scheduling list, the scheduling periodicity of the to-be-requested SI, and the receiving window length associated with each of the second class SI; obtaining a starting subframe of the receiving window associated with the to-be-requested SI according to the appearance order of the to-be-requested SI in the scheduling list and the receiving window length associated with each of the second class SI; and determining consecutive M subframes from the starting subframe as the receiving window associated with the to-be-requested SI, where M refers to a length of the receiving window associated with the to-be-requested SI.

In an embodiment, the method for receiving SI may further include: obtaining a time-frequency resource configured for sending the preamble according to the first class SI; and determining a first uplink subframe configured for sending the preamble according to the time-frequency resource, and performing an operation of sending the preamble in the uplink subframe configured for sending the preamble based on the first uplink subframe.

In another embodiment, the method for receiving SI may further include: determining the first uplink subframe configured for sending the preamble according to a system preset time-frequency resource, and performing an operation of sending the preamble in the uplink subframe configured for sending the preamble based on the first uplink subframe.

In an embodiment, receiving the to-be-requested SI within the receiving window associated with the to-be-requested SI, where the to-be-requested SI is sent by the base station according to the receiving window, includes: determining whether the to-be-requested SI is sent on the PDSCH according to an SI scheduling instruction, and if the to-be-requested SI is sent on the PDSCH, the to-be-requested SI is received on the PDSCH within the receiving window associated with the to-be-requested SI.

In an embodiment, determining the preamble associated with the to-be-requested SI includes: determining the preamble associated with the second class SI according to the first class SI, or determining the preamble associated with the second class SI according to a system preset preamble.

In an embodiment, all of the second class SI associates with one preamble. In another embodiment, each of the second class SI associates with different preambles.

Reference may be made to subsequent embodiments on how to specifically receive the SI.

According to the above methods provided by embodiments of the present disclosure, UE may determine the receiving window associated with each of the second class SI and receive the SI within the corresponding receiving window. The SI is sent by a base station according to the receiving window. Further, since the SI may be received on the PDSCH, it can be guaranteed that a plurality of UEs may multiplex the SI sent by the base station. In this way, the problem that that too many preambles are required for sending a combination of multiple pieces of SI, resulting in that the base station has difficulty in sending the SI simultaneously when the UE applies for the multiple pieces of SI at a time, is avoided, and the sending and receiving performance of the SI is improved at the same time.

The technical solution provided by an embodiment of the present disclosure will be described below based on a specific example.

Figure 2:
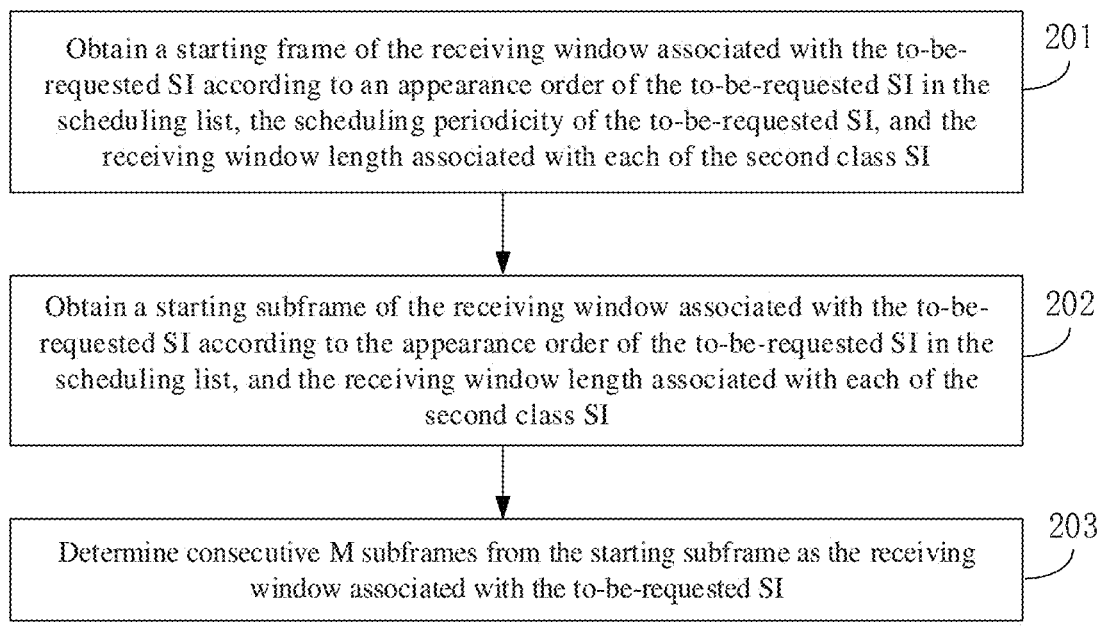
FIG. 2 is a flowchart of a method for receiving SI according to another embodiment of the present disclosure.

FIG. 2 is a flowchart of a method for receiving SI according to another embodiment of the present disclosure. Based on the above methods provided by embodiments of the present disclosure, descriptions will be made by determining a receiving window of to-be-requested SI according to a scheduling list included in the first class SI. As shown in FIG. 2, the method includes the following steps.

At step 201, a starting frame of the receiving window associated with the to-be-requested SI is obtained according to an appearance order of the to-be-requested SI in a scheduling list, scheduling periodicity of the to-be-requested SI, and the receiving window length associated with each of the second class SI.

In an embodiment, each SI is associated with an SI receiving window, and an appearance order of each SI in the scheduling list is configured to indicate an order of the corresponding SI receiving window in the scheduling list. For example, the appearance order of the first SI in the scheduling list is 1, the appearance order of the second SI is 2, and the appearance order of the n-th SI is n.

In an embodiment, the scheduling periodicities of different SI are independent from each other and do not affect each other. For example, the scheduling periodicity of SI 1 may be 40 ms, and the scheduling periodicity of SI 2 may be 80 ms.

In an embodiment, the frame length may be 10 ms.

In an embodiment, the receiving window length associated with each SI may be same, for example, all receiving window length is 8 ms. In another embodiment, the receiving window length associated with each SI may also be different.

In an embodiment, the starting frame of the receiving window associated with the to-be-requested SI may be calculated based on formula (1):

$$\text{SFN} \bmod T = \text{FLOOR}(x/k) \quad (1),$$

where, SFN refers to the system frame number of the to-be-requested SI, T refers to the scheduling periodicity of the to-be-requested SI, k refers to the frame length, FLOOR function is used to calculate a rounded-down value, and FLOOR(x/k) is used to calculate the largest integer not greater than x/k. For example, if x/k=3.15, FLOOR(x/k)=3.

In an embodiment, when the receiving window length associated with each SI is same, x may be calculated based on formula (1-1):

$$x = (n-1) \times M \quad (1\text{-}1),$$

where, n indicates the appearance order of the to-be-requested SI in the scheduling list, and M refers to the receiving window length associated with each SI.

In another embodiment, when the receiving window length associated with each SI is different, x may be calculated based on formula (1-2):

$$x = M_1 + M_2 + \ldots + M_{n-1} \quad (1\text{-}2),$$

where, n indicates the appearance order of the to-be-requested SI in the scheduling list, and $M_1, M_2, \ldots, M_{n-1}$ refer to the respective receiving window length associated with each of SI appeared before the receiving window associated with the to-be-requested SI.

At step 202, a starting subframe of the receiving window associated with the to-be-requested SI is obtained according to the appearance order of the to-be-requested SI in the scheduling list and the receiving window length associated with each of the second class SI.

In an embodiment, the starting subframe of the receiving window of the to-be-requested SI may be calculated based on formula (2):

$$a = x \bmod k + \text{offset} \quad (2),$$

where, a indicates a subframe number of the starting subframe, x may be calculated based on the formula (1-1) or the formula (1-2), k refers to the frame length, and offset may be analysed from the first class SI, or may be a fixed system preset value. For example, the offset may be a value of 0, 1, 2, and so on.

At step 203, consecutive M subframes from the starting subframe are determined as the receiving window associated with the to-be-requested SI.

In an embodiment, M refers to length of the receiving window associated with the to-be-requested SI.

At steps 201-203, in an embodiment, if the scheduling periodicity of the to-be-requested SI is 80 ms, the appearance order of the to-be-requested SI in the scheduling list is 3, the receiving window length associated with each SI is same, the receiving window length is 10 ms, the frame length is 10 ms, and offset is 1. Thus, x=20 ms, SFN mod 8=FLOOR(x/k)=2, and the SFN of the to-be-requested SI is 10, . . . , 10+8×z, where z refers to a natural number. If the starting subframe associated with the to-be-requested SI is a=20 mod 10+1=1, the subframe number of the starting subframe is 1.

In this embodiment, the UE may determine the receiving window associated with the to-be-requested SI according to the scheduling information in the scheduling list, thereby ensuring that the UE can determine when the receiving window arrives, and further request the to-be-requested SI in response to the receiving window and receiving the to-be-requested SI within the receiving window.

FIG. 3 is a flowchart of a method for receiving SI according to an embodiment of the present disclosure. Descriptions will be made by taking how to receive to-be-requested SI on a PDSCH as an example by using the above methods provided by embodiments of the present disclosure. As shown in FIG. 3, the method includes the following steps.

At step 301, whether the to-be-requested SI is sent on a PDSCH is determined according to an SI scheduling instruction.

At step 302, when the to-be-requested SI is sent on the PDSCH, the to-be-requested SI is received on the PDSCH within the receiving window associated with the to-be-requested SI.

In an embodiment, a transmission format for time-frequency domain scheduling information and SI may be obtained by analysing SI-RNTI. The transmission format may include a transmit number of times and a transmission channel of the to-be-requested SI.

In an embodiment, the base station may send the to-be-requested SI N times within the receiving window, but the UE receives the to-be-requested SI within the receiving window and may stop receiving the to-be-requested SI after receiving the correct SI.

In the embodiment, all UE may be controlled to receive the to-be-requested SI within the receiving window, and the to-be-requested SI may be sent on the PDSCH according to the SI scheduling instruction. In this way, a plurality of UEs may multiplex the to-be-requested SI sent by the base station, and the sending and receiving performance of the SI is improved.

Figure 4:
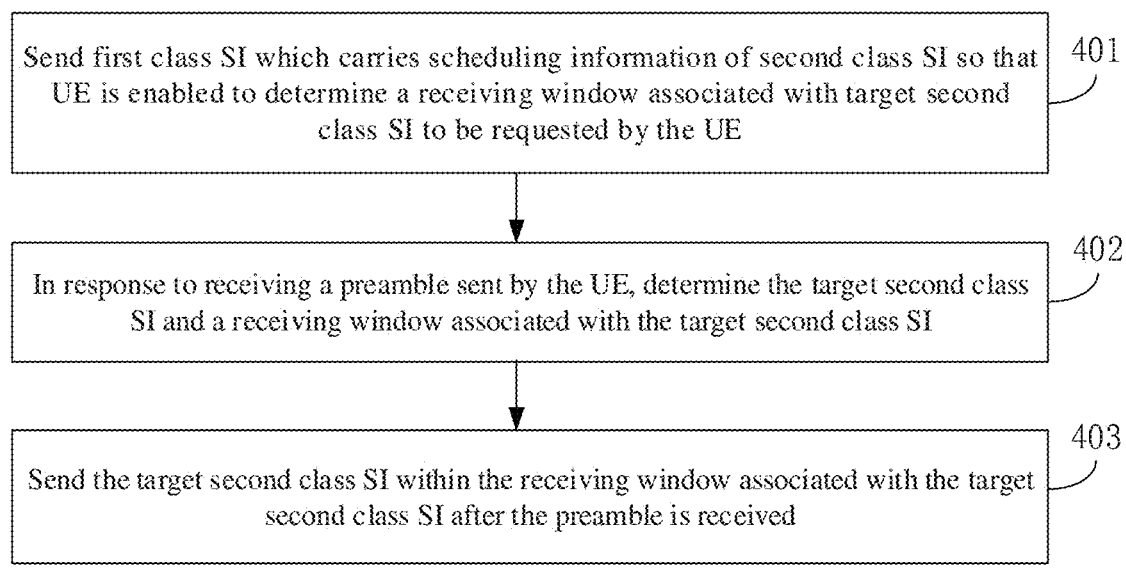
FIG. 4 is a flowchart of a method for sending SI according to an embodiment of the present disclosure.

FIG. 4 is a flowchart of a method for sending SI according to an embodiment of the present disclosure. The method for sending SI may be applied to a base station, and the embodiment will be described in combination with FIG. 1B. As shown in FIG. 4, the method for sending SI includes the following steps 401-403.

At step 401, first class SI is sent, and the first class SI carries scheduling information of second class SI so that UE is enabled to determine a receiving window associated with target second class SI to be requested by the UE.

In an embodiment, the first class SI may include information relating to cell selection and cell access, for example, paging information. In another embodiment, in addition to implementing its own functions, such as a UE random access function, the first class SI may also include scheduling information of the second class SI. When the UE requests target second class SI, the scheduling information is configured for the UE to determine a receiving window associated with the target second class SI.

In an embodiment, if the scheduling information includes a preamble associated with the target second class SI, the scheduling information may also be configured to determine the preamble associated with the target SI requested by the UE.

At step 402, in response to receiving a preamble sent by the UE, the target second class SI and a receiving window associated with the target second class SI are determined.

In an embodiment, after a particular receiving window associated with the target second class SI arrives, the UE may send the preamble in the first uplink subframe which is configured for sending the preamble. The base station may determine the particular receiving window according to timing of receiving the preamble. Thus, the base station may determine the target second class SI requested by the UE according to the particular receiving window.

At step 403, the target second class SI is sent within the receiving window associated with the target second class SI after the preamble is received.

In an embodiment, after receiving the preamble, the base station may send the target second class SI N times within a corresponding downlink subframe of the receiving window, where N is a natural number not less than 1.

In an embodiment, after receiving the preamble, the base station may determine the receiving window associated with the target second class SI. Then the base station may send the target second class SI corresponding to the preamble on a PDSCH according to an SI scheduling instruction, and the target second class SI may be sent within the receiving window, so that all UE may receive the SI.

In an illustrative scenario, as shown in FIG. 1B, a description is made by taking a mobile network as an LTE network and a base station as an evolved Node B (eNB). In the scenario shown in FIG. 1B, eNB 10 and UE 20 are included, where the eNB 10 periodically broadcasts the first class SI, and the UE 20 may determine a receiving window and a preamble associated with to-be-requested SI when receiving the first class SI. In response to arrival of the receiving window associated with the to-be-requested SI, the UE 20 may send the corresponding preamble in the first uplink subframe, and the eNB 10 may determine which SI is requested by the UE 20 after receiving the preamble. The SI requested by the UE 20 is determined as target second class SI. Then the eNB 10 may send the target second class SI within a downlink subframe of the receiving window. The transmission of each second class SI is limited to the corresponding receiving window, and each of the receiving windows does not overlap. Therefore, the problems that the preambles consumption is large due to excessive SI combinations and the base station has difficulty in sending the SI combinations simultaneously may be avoided, where the SI combinations includes several SI sent together Based on the above steps 401-403 of the embodiment, the base station may be controlled to send the target second class SI within a corresponding receiving window. In this way, the problem that that too many preambles are required for sending a combination of multiple pieces of SI, resulting in that the base station has difficulty in sending the SI simultaneously when the UE applies for the multiple pieces of SI at a time, is avoided, and the sending and receiving performance of the SI is improved at the same time.

In an embodiment, sending the target second class SI within the receiving window associated with the target second class SI includes: sending the target second class SI N times within the receiving window associated with the target second class SI, where N is a natural number not less than 1.

In another embodiment, sending the target second class SI within the receiving window associated with the target second class SI includes: sending the target second class SI corresponding to the preamble on the PDSCH based on an SI scheduling instruction, wherein the target second class SI is sent within the receiving window associated with the target second class SI.

In an embodiment, the method for sending SI may further includes: for each of the second class SI, determining scheduling information, wherein the scheduling information includes a receiving window length and a scheduling periodicity; adding the scheduling information of the second class SI to a scheduling list in an order, wherein the UE is caused to calculate a corresponding receiving window associated with the second class SI according to the order; and generating the first class SI according to the scheduling list.

Reference may be made to subsequent embodiments on how to specifically generate the first class SI.

Thus, according to the above methods provided by embodiments of the present disclosure, each of the second class SI may be limited to a corresponding time window for sending. Therefore, the problems that the preambles consumption is large due to excessive SI combinations and the base station has difficulty in sending the SI combinations simultaneously may be avoided, where the SI combinations include a number of SI sent together.

The technical solution provided by an embodiment of the present disclosure will be described below based on a specific example.

Figure 5:
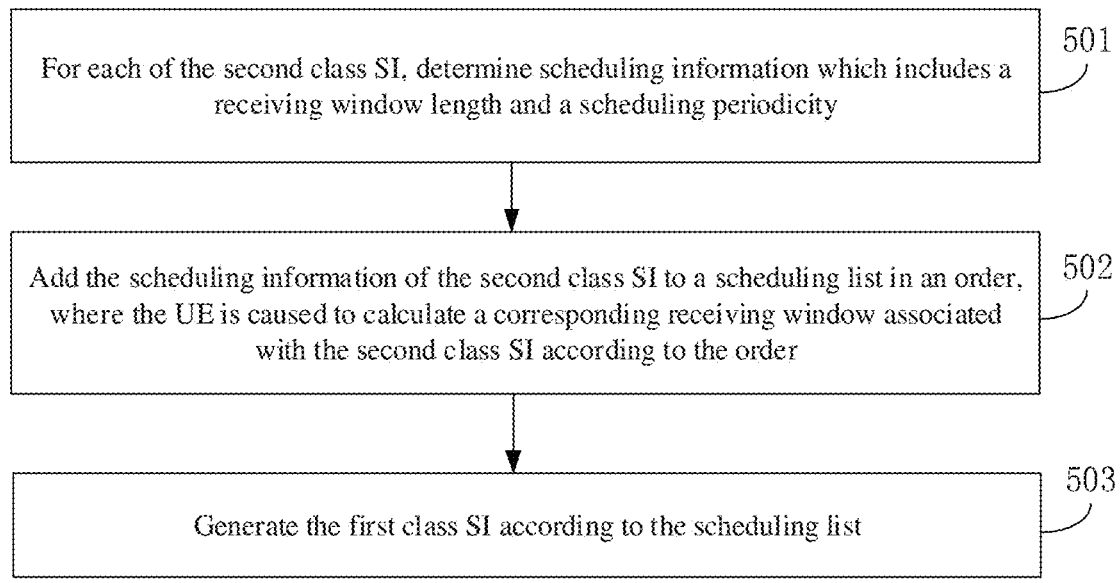
FIG. 5 is a flowchart of a method for sending SI according to another embodiment of the present disclosure.

FIG. 5 is a flowchart of a method for sending SI according to another embodiment of the present disclosure. Descriptions will be made by taking how to generate first class SI as an example by using the above method provided by embodiments of the present disclosure. As shown in FIG. 5, the method includes the following steps.

At step 501, for each second class SI, scheduling information is determined, and the scheduling information includes a receiving window length and a scheduling periodicity.

In an embodiment, the scheduling information may also include scheduling information such as an offset of a starting subframe of each receiving window and a time-frequency resource configured for sending a preamble by the UE.

In an embodiment, the scheduling periodicity of each second class SI is independent from each other. In some embodiments, the length of each receiving window may be same or may be different.

At step 502, the scheduling information of each the second class SI is added to a scheduling list in an order, wherein the UE is caused to calculate a corresponding receiving window associated with the second class SI according to the order.

In an embodiment, the scheduling information of each SI is added to the scheduling list in an order, so that the UE may calculate the receiving window associated with the second class SI according to an appearance order of the scheduling information in the scheduling list.

At step 503, the first class SI is generated according to the scheduling list.

In an embodiment, the first class SI in the present disclosure may be generated by adding the generated scheduling list to the first class SI.

In an illustrative scenario, as shown in FIG. 1B, after determining the scheduling information of each of the second class SI by the eNB 10, the scheduling information of the second class SI may be added to the first class SI. When the eNB 10 broadcasts the first class SI, the UE 20 may determine the receiving window associated with each of the second class SI according to the scheduling information of the second class SI. Therefore, the UE 20 may send a preamble corresponding to the target second class SI in response to arrival of the receiving window of the target second class SI, then the UE 20 may receive the target second class SI sent by the eNB 10 within the receiving window.

In this embodiment, the base station adds the scheduling information of the second class SI to the first class SI, thus the UE is caused to receive the target second class SI within a corresponding receiving window. In this way, the problem that that too many preambles are required for sending a combination of multiple pieces of SI, resulting in that the base station has difficulty in sending the SI simultaneously when the UE applies for the multiple pieces of SI at a time, is avoided.

Figure 6:
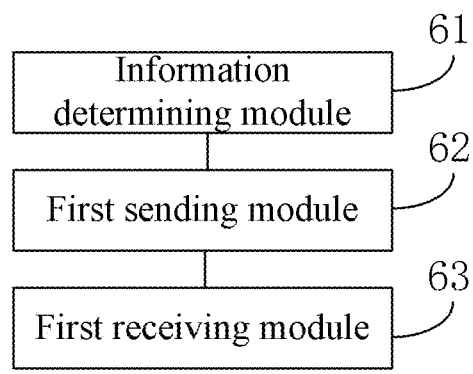
FIG. 6 is a block diagram illustrating an apparatus for receiving SI according to an embodiment of the present disclosure.

FIG. 6 is a block diagram illustrating an apparatus for receiving SI according to an embodiment of the present disclosure. As shown in FIG. 6, the apparatus for receiving SI may include: an information determining module 61 configured to determine a receiving window and a preamble associated with to-be-requested SI in response to receiving first class SI broadcasted by a base station, wherein the to-be-requested SI belongs to second class SI; a first sending module 62 configured to send the preamble in an uplink subframe configured for sending the preamble in response to arrival of the receiving window associated with the to-be-requested SI; and a first receiving module 63 configured to receive the to-be-requested SI within the receiving window associated with the to-be-requested SI, wherein the to-be-requested SI is sent by the base station according to the receiving window.

Figure 7:
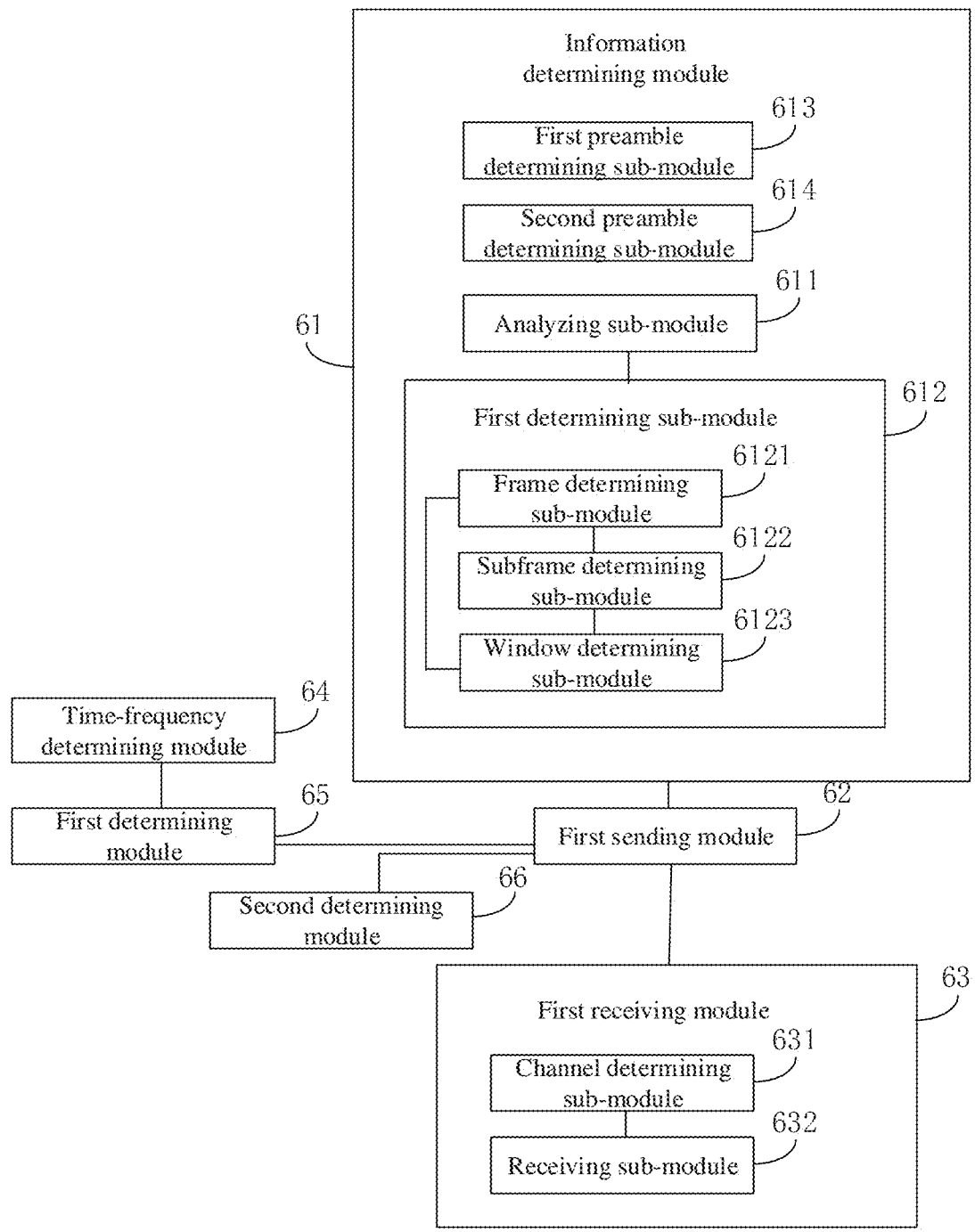
FIG. 7 is a block diagram illustrating an apparatus for receiving SI according to another embodiment of the present disclosure.

FIG. 7 is a block diagram illustrating an apparatus for receiving SI according to another embodiment of the present disclosure. As shown in FIG. 7, based on the above embodiment shown in FIG. 6, in an embodiment, the information determining module 61 may include: an analyzing sub-module 611 configured to obtain a scheduling list of the second class SI according to the first class SI, wherein the scheduling list is configured to record a receiving window length and a scheduling periodicity of the second class SI; and a first determining sub-module 612 configured to determine the receiving window associated with the to-be-requested SI according to the receiving window length and the scheduling periodicity in the scheduling list obtained by the analyzing sub-module 611.

In an embodiment, the first determining sub-module 612 may include: a frame determining sub-module 6121 configured to obtain a starting frame of the receiving window associated with the to-be-requested SI according to an appearance order of the to-be-requested SI in the scheduling list, the scheduling periodicity of the to-be-requested SI, and the receiving window length associated with each of the second class SI, where the scheduling list is obtained by the analyzing sub-module 611; a subframe determining sub-module 6122 configured to obtain a starting subframe of the receiving window associated with the to-be-requested SI according to the appearance order of the to-be-requested SI in the scheduling list and the receiving window length associated with each of the second class SI, wherein the scheduling list is obtained by the analyzing sub-module 611; and a window determining sub-module 6123 configured to determine consecutive M subframes from the starting subframe determined by the subframe determining sub-module 6122 as the receiving window associated with the to-be-requested SI, where M refers to length of the receiving window associated with the to-be-requested SI.

In an embodiment, the apparatus may also include: a time-frequency determining module 64 configured to obtain a time-frequency resource configured for sending the preamble according to the first class SI; and a first determining module 65 configured to determine a first uplink subframe configured for sending the preamble according to the time-frequency resource determined by the time-frequency determining module 64, and the first sending module 62 performs an operation of sending the preamble in the uplink subframe configured for sending the preamble according to the first uplink subframe.

In an embodiment, the apparatus may also include: a second determining module 66 configured to determine a first uplink subframe configured for sending the preamble according to a system preset time-frequency resource, and the first sending module 62 performs an operation of sending the preamble in the uplink subframe configured for sending the preamble according to the first uplink subframe.

In an embodiment, the first receiving module 63 may include: a channel determining sub-module 631 configured to determine whether the to-be-requested SI is sent on a physical downlink shared channel according to an SI scheduling instruction; and a receiving sub-module 632 configured to receive the to-be-requested SI on the physical downlink shared channel within the receiving window associated with the to-be-requested SI when the to-be-requested SI sent on the physical downlink shared channel is determined by the channel determining sub-module 631.

In an embodiment, the information determining module 61 may include: a first preamble determining sub-module 613 configured to determine the preamble associated with the second class SI according to the first class SI; or a second preamble determining sub-module 614 configured to determine the preamble associated with the second class SI according to a system preset preamble.

In an embodiment, all of the second class SI associates with one preamble, or each of the second class SI associates with different preambles.

Figure 8:
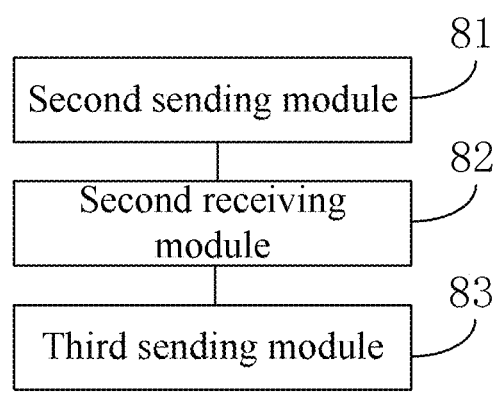
FIG. 8 is a block diagram illustrating an apparatus for sending SI according to an embodiment of the present disclosure.

FIG. 8 is a block diagram illustrating an apparatus for sending SI according to an embodiment of the present disclosure. As shown in FIG. 8, the apparatus for sending SI includes: a second sending module 81 configured to send first class SI which carries scheduling information of second class SI so that UE is enabled to determine a receiving window associated with target second class SI to be requested by the UE; a second receiving module 82 configured to determine the target second class SI and a receiving window associated with the target second class SI in response to receiving a preamble sent by the UE; and a third sending module 83 configured to send the target second class SI within the receiving window associated with the target second class SI after the second receiving module receives the preamble.

Figure 9:
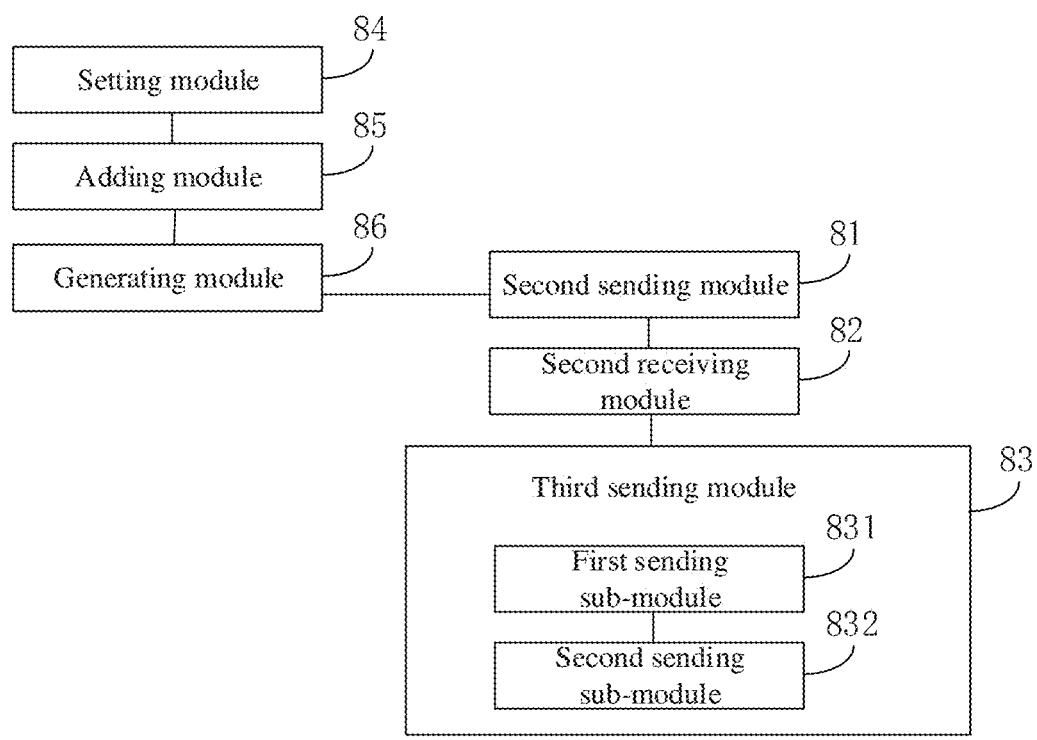
FIG. 9 is a block diagram illustrating an apparatus for sending SI according to another embodiment of the present disclosure.

FIG. 9 is a block diagram illustrating an apparatus for sending SI according to another embodiment of the present disclosure. As shown in FIG. 9, based on the above embodiment shown in FIG. 8, in an embodiment, the third sending module 83 may include: a first sending sub-module 831 configured to send the target second class SI N times within the receiving window associated with the target second class SI, wherein N refers to a natural number not less than 1.

In an embodiment, the third sending module 83 may include: a second sending sub-module 832 configured to send the target second class SI corresponding to the preamble on a physical downlink shared channel according to a SI scheduling instruction, and send the target second class SI within the receiving window associated with the target second class SI.

In an embodiment, the apparatus may also include: a setting module 84 configured to determine scheduling information which includes a receiving window length and a scheduling periodicity for each second class SI; an adding module 85 configured to add the scheduling information of each second class SI to a scheduling list in an order, wherein the UE is caused to calculate a corresponding receiving window associated with the second class SI according to the order, and the scheduling information is determined by the setting module 84; and a generating module 86 configured to generate the first class SI according to the scheduling list obtained by the adding module 85.

For the above apparatus in the embodiments, specific manners in which each module performs operations is already described in detail in related method embodiments, and will not be described in detail herein.

Figure 10:
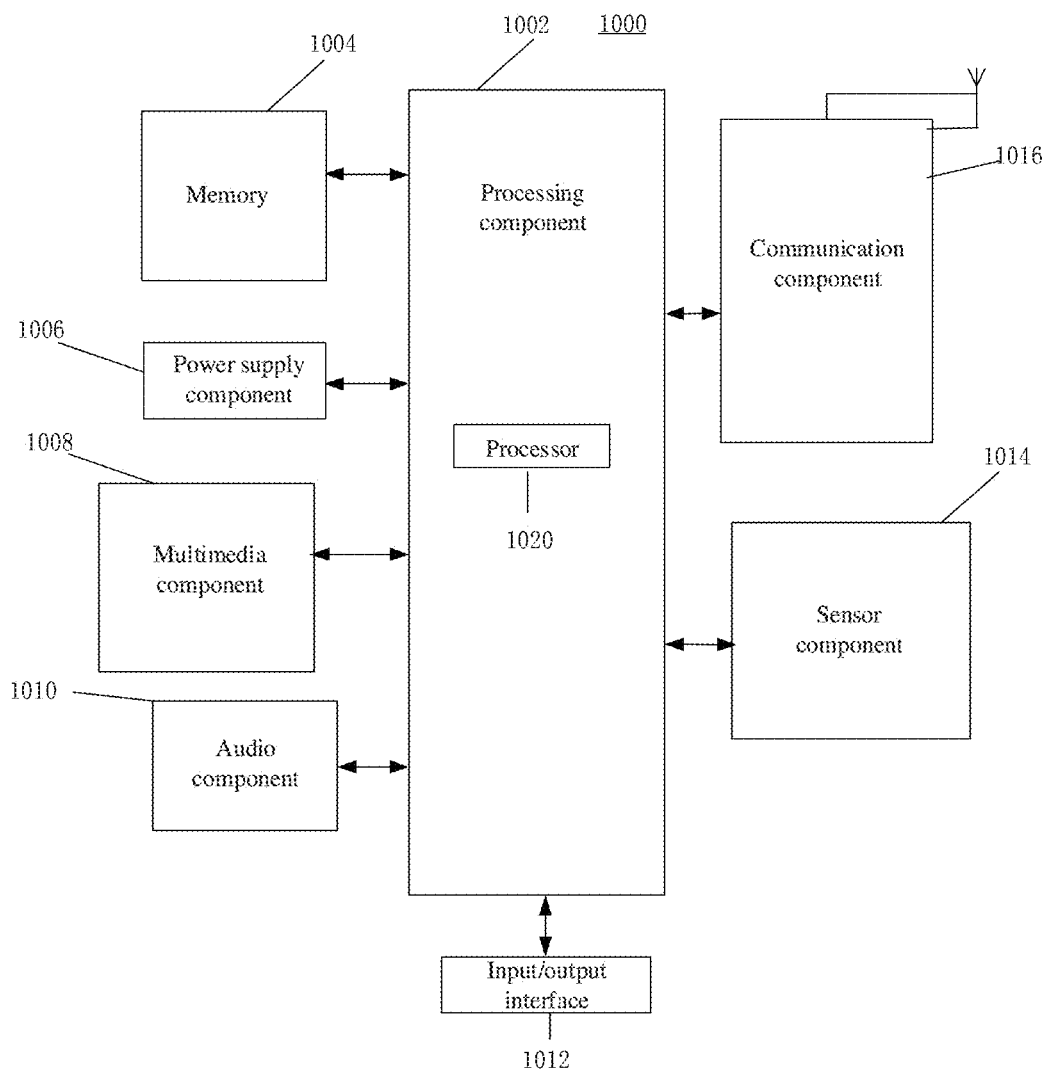
FIG. 10 is a block diagram illustrating an apparatus for receiving SI according to an embodiment of the present disclosure.

FIG. 10 is a block diagram illustrating apparatus 1000 for receiving SI according to an embodiment of the present disclosure. For example, the apparatus 1000 may be user equipment, such as a mobile phone, a computer, a digital broadcasting terminal, a message receiving and sending device, a game console, a tablet device, a medical device, a fitness device, a personal digital assistant, and so on.

As shown in FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls overall operations of the apparatus 1000, such as operations associated with display, phone calls, data communications, camera operations, and recording operations. The processing component 1002 may include one or more processors 1020 for executing instructions to complete all or a part of steps of the above method. In addition, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 may be configured to store various types of data to support the operation of the apparatus 1000. Examples of such data include instructions for any application or method operated on the apparatus 1000, contact data, phonebook data, messages, pictures, videos, and so on. The memory 1004 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1006 may provide power to different components of the apparatus 1000. The power supply component 1006 may include a power management system, one or more power supplies and other components associated with generating, managing, and distributing power for the apparatus 1000.

The multimedia component 1008 may include a screen providing an output interface between the apparatus 1000 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some embodiments, the multimedia component 1008 may include a front camera and/or a rear camera. The front camera and/or rear camera may receive external multimedia data when the apparatus 1000 is in an operating mode, such as a photographing mode or a video mode. Each of the front camera and the rear camera may be a fixed optical lens system or have focal length and optical zooming capability.

The audio component 1010 may be configured to output and/or input an audio signal. For example, the audio component 1010 may include a microphone (MIC) configured to receive an external audio signal when the apparatus 1000 is in an operating mode, such as a call mode, a recording mode, and a voice recognition mode. The received audio signal may be further stored in the memory 1004 or sent via the communication component 1016. In some embodiments, the audio component 1010 further includes a speaker to output an audio signal.

The I/O interface 1012 provides an interface between the processing component 1002 and peripheral interface modules. The above peripheral interface modules may be a keyboard, a click wheel, buttons, and so on. These buttons may include, but are not limited to, a home button, a volume button, a starting button, and a locking button.

The sensor component 1014 may include one or more sensors to provide status assessments of various aspects for the apparatus 1000. For example, the sensor component 1014 may detect an on/off state of the apparatus 1000, and relative positioning of component, for example, the component is a display and a keypad of the apparatus 1000. The sensor component 1014 may also detect a change in position of the apparatus 1000 or one component of the apparatus 1000, a presence or absence of the contact between a user and the apparatus 1000, an orientation or an acceleration/deceleration of the apparatus 1000, and a change in temperature of the apparatus 1000. The sensor component 1014 may include a proximity sensor configured to detect the presence of a nearby object without any physical contact. The sensor component 1014 may further include an optical sensor, such as a CMOS or CCD image sensor which is used in imaging applications. In some embodiments, the sensor component 1014 may further include an acceleration sensor, a gyroscope sensor, a magnetic sensor, a pressure sensor, or a temperature sensor.

The communication component 1016 may be configured to facilitate wired or wireless communication between the apparatus 1000 and other devices. The apparatus 1000 may access a wireless network that is based on a communication standard, such as Wi-Fi, 2G, 3G, 4G or 5G or a combination thereof. In an example, the communication component 1016 receives broadcast signals or broadcast-associated information from an external broadcast management system via a broadcast channel. In an example, the communication component 1016 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an embodiment, the apparatus 1000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above method.

In an embodiment, there is also provided a non-transitory machine-readable storage medium including instructions, such as the memory 1004 including instructions. The above instructions may be executed by the processor 1020 of the apparatus 1000 to perform the above method. For example, the non-transitory machine-readable storage medium may be a ROM, a CD-ROM, a magnetic tape, a floppy disk, and an optical data storage device and so on.

The processor 1020 is configured to: in response to receiving first class SI broadcast by a base station, determine a receiving window and a preamble associated with to-be-requested SI, wherein the to-be-requested SI belongs to second class SI; in response to arrival of the receiving window associated with the to-be-requested SI, send the preamble in an uplink subframe configured for sending the preamble; and receive the to-be-requested SI within the receiving window associated with the to-be-requested SI, where the to-be-requested SI is sent by the base station according to the receiving window.

Figure 11:
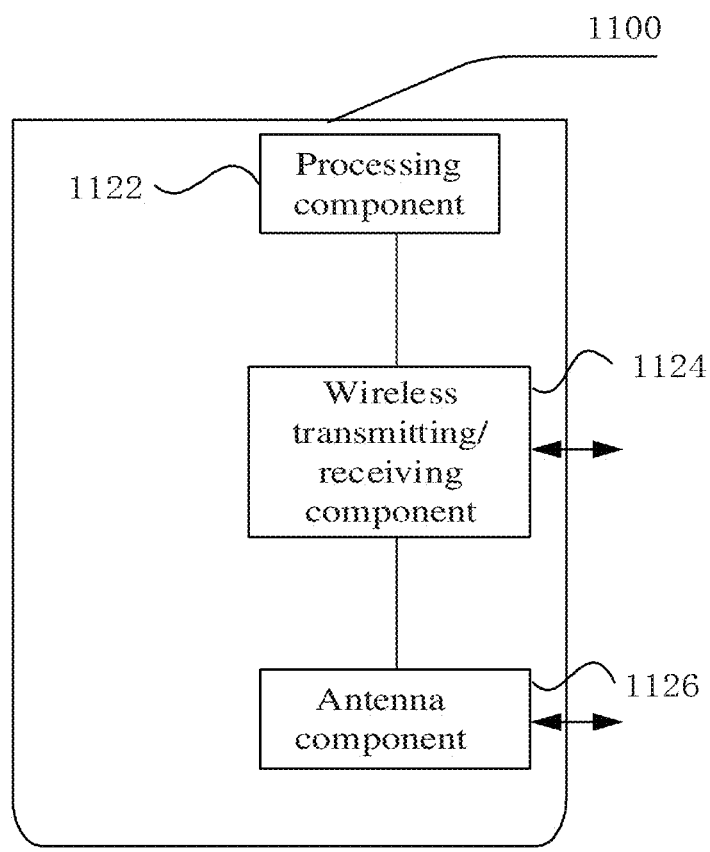
FIG. 11 is a block diagram illustrating an apparatus for sending SI according to an embodiment of the present disclosure.

FIG. 11 is a block diagram illustrating apparatus 1100 for sending SI according to an embodiment of the present disclosure. The apparatus 1100 may be provided as a base station. As shown in FIG. 11, the apparatus 1100 includes a processing component 1122, a wireless transmitting/receiving component 1124, an antenna component 1126, and a signal processing part unique to a wireless interface. The processing component 1122 may further include one or more processors.

One of the processors in the processing component 1122 may be configured to: send first class SI which carries scheduling information of second class SI so that UE is enabled to determine a receiving window associated with target second class SI to be requested by the UE; in response to receiving a preamble sent by the UE, determine the target second class SI and a receiving window associated with the target second class SI; and after the preamble is received, send the target second class SI within the receiving window associated with the target second class SI.

Other implementations of the present disclosure will be apparent to those skilled in the art from consideration of the specification and practice of the present disclosure herein. The present disclosure is intended to cover any variations, usages, or adaptations of the present disclosure that follow the general principles thereof and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of receiving system information (SI), comprising:
    in response to receiving first class SI broadcasted by a base station, determining a receiving window and a preamble associated with to-be-requested SI, wherein the to-be-requested SI belongs to second class SI;
    in response to arrival of the receiving window associated with the to-be-requested SI, sending the preamble in an uplink subframe configured for sending the preamble; and
    receiving the to-be-requested SI within the receiving window associated with the to-be-requested SI, wherein the to-be-requested SI is sent by the base station according to the receiving window.

2. The method of claim 1, wherein determining the receiving window associated with the to-be-requested SI comprises:
    obtaining a scheduling list of the second class SI according to the first class SI, wherein the scheduling list is configured to record a receiving window length and a scheduling periodicity of the second class SI; and
    determining the receiving window associated with the to-be-requested SI according to the receiving window length and the scheduling periodicity recorded in the scheduling list.

3. The method of claim 2, wherein determining the receiving window associated with the to-be-requested SI according to the receiving window length and the scheduling periodicity recorded in the scheduling list comprises:
    obtaining a starting frame of the receiving window associated with the to-be-requested SI according to an appearance order of the to-be-requested SI in the scheduling list, the scheduling periodicity of the to-be-requested SI, and the receiving window length associated with each of the second class SI;
    obtaining a starting subframe of the receiving window associated with the to-be-requested SI according to the appearance order of the to-be-requested SI in the scheduling list and the receiving window length associated with each of the second class SI; and
    determining consecutive M subframes from the starting subframe as the receiving window associated with the to-be-requested SI, wherein M refers to a length of the receiving window associated with the to-be-requested SI.

4. The method of claim 1, further comprising:
    obtaining a time-frequency resource configured for sending the preamble according to the first class SI;
    determining a first uplink subframe configured for sending the preamble according to the time-frequency resource; and
    performing an operation of sending the preamble in the uplink subframe configured for sending the preamble according to the first uplink subframe.

5. The method of claim 1, further comprising:
    determining a first uplink subframe configured for sending the preamble according to a system preset Lime-frequency resource; and
    performing an operation of sending the preamble in the uplink subframe configured for sending the preamble according to the first uplink subframe.

6. The method of claim 1, wherein receiving the to-be-requested SI within the receiving window associated with the to-be-requested SI comprises:
    determining whether the to-be-requested SI is sent on a physical downlink shared channel according to an SI scheduling instruction; and
    when the to-be-requested SI is sent on the physical downlink shared channel, receiving the to-be-requested SI on the physical downlink shared channel within the receiving window associated with the to-be-requested SI.

7. The method of claim 1, wherein determining the preamble associated with the to-be-requested SI comprises at least one of:
    determining the preamble associated with the second class SI according to the first class SI; or
    determining the preamble associated with the second class SI according to a system preset preamble.

8. The method of claim 1, wherein
    all of the second class SI associates with one preamble; or
    each of the second class SI associates with a different preamble.

9. A method of sending system information (SI), comprising:
sending first class SI which carries scheduling information of second class SI so that user equipment is enabled to determine a receiving window associated with target second class SI to be requested by the user equipment;
in response to receiving a preamble sent by the user equipment, determining the target second class SI and a receiving window associated with the target second class SI; and
after the preamble is received, sending the target second class SI within the receiving window associated with the target second class SI.

10. The method of claim 9, wherein sending the target second class SI within the receiving window associated with the target second class SI comprises:
sending the target second class SI N times within the receiving window associated with the target second class SI, wherein N refers to a natural number not less than 1.

11. The method of claim 9, wherein sending the target second class SI within the receiving window associated with the target second class SI comprises:
sending the target second class SI corresponding to the preamble on a physical downlink shared channel according to an SI scheduling instruction; and
sending the target second class SI within the receiving window associated with the target second class SI.

12. The method of claim 9, further comprising:
for each second class SI, determining scheduling information which comprises a receiving window length and a scheduling periodicity;
adding the scheduling information of the second class SI to a scheduling list in an order, wherein the user equipment is caused to calculate a corresponding receiving window associated with the second class SI according to the order; and
generating the first class SI according to the scheduling list.

13. User equipment, comprising:
a processor; and
a memory for storing instructions executable by the processor;
wherein the processor is configured to:
determine a receiving window and a preamble associated with to-be-requested system information (SI) in response to receiving first class SI broadcast by a base station, wherein the to-be-requested SI belongs to second class SI;
send the preamble in an uplink subframe configured for sending the preamble in response to arrival of the receiving window associated with the to-be-requested SI; and
receive the to-be-requested SI within the receiving window associated with the to-be-requested SI, wherein the to-be-requested SI is sent by the base station according to the receiving window.

14. The user equipment of claim 13, wherein determining the receiving window associated with the to-be-requested SI comprises:
obtaining a scheduling list of the second class SI according to the first class SI, wherein the scheduling list is configured to record a receiving window length and a scheduling periodicity of the second class SI; and
determining the receiving window associated with the to-be-requested SI according to the receiving window length and the scheduling periodicity recorded in the scheduling list.

15. The user equipment of claim 14, wherein determining the receiving window associated with the to-be-requested SI according to the receiving window length and the scheduling periodicity recorded in the scheduling list comprises:
obtaining a starting frame of the receiving window associated with the to-be-requested SI according to an appearance order of the to-be-requested SI in the scheduling list, the scheduling periodicity of the to-be-requested SI, and the receiving window length associated with each of the second class SI;
obtaining a starting subframe of the receiving window associated with the to-be-requested SI according to the appearance order of the to-be-requested SI in the scheduling list and the receiving window length associated with each of the second class SI; and
determining consecutive M subframes from the starting subframe as the receiving window associated with the to-be-requested SI, wherein M refers to a length of the receiving window associated with the to-be-requested SI.

16. The user equipment of claim 13, wherein the processor is further configured to:
obtain a time-frequency resource configured for sending the preamble according to the first class SI;
determine a first uplink subframe configured for sending the preamble according to the time-frequency resource; and
perform an operation of sending the preamble in the uplink subframe configured for sending the preamble according to the first uplink subframe.

17. The user equipment of claim 13, wherein the processor is further configured to:
determine a first uplink subframe configured for sending the preamble according to a system preset time-frequency resource; and
perform an operation of sending the preamble in the uplink subframe configured for sending the preamble according to the first uplink subframe.

18. The user equipment of claim 13, wherein receiving the to-be-requested SI within the receiving window associated with the to-be-requested SI comprises:
determining whether the to-be-requested SI is sent on a physical downlink shared channel according to an SI scheduling instruction; and
when the to-be-requested SI is sent on the physical downlink shared channel, receiving the to-be-requested SI on the physical downlink shared channel within the receiving window associated with the to-be-requested SI.

19. A base station, comprising:
a processor; and
a memory for storing instructions executable by the processor,
wherein the processor is configured to execute the instructions to perform the method of claim 9.

20. The base station of claim 19, wherein the processor is further configured to:
for each second class SI, determine scheduling information which comprises a receiving window length and a scheduling periodicity;
add the scheduling information of the second class SI to a scheduling list in an order, wherein the user equipment is caused to calculate a corresponding receiving window associated with the SI according to the order; and
generate the first class SI according to the scheduling list.

* * * * *